(12) United States Patent
Foret

(10) Patent No.: US 11,806,686 B2
(45) Date of Patent: Nov. 7, 2023

(54) SYSTEM, METHOD AND APPARATUS FOR CREATING AN ELECTRICAL GLOW DISCHARGE

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

(*) Notice: Subject to any disclaimer, the term of this patent is extended or adjusted under 35 U.S.C. 154(b) by 1237 days.

(21) Appl. No.: 16/254,573

(22) Filed: Jan. 22, 2019

(65) Prior Publication Data
US 2019/0195053 A1    Jun. 27, 2019

Related U.S. Application Data

(63) Continuation-in-part of application No. 15/480,468, filed on Apr. 6, 2017, now Pat. No. 10,184,322, (Continued)

(51) Int. Cl.
*E21B 43/08* (2006.01)
*B01J 19/08* (2006.01)
(Continued)

(52) U.S. Cl.
CPC ........... *B01J 19/088* (2013.01); *C10B 23/00* (2013.01); *C10B 53/06* (2013.01); *E21B 36/008* (2013.01);
(Continued)

(58) Field of Classification Search
CPC ........ E21B 36/008; E21B 36/04; E21B 43/00; E21B 43/08; E21B 43/082; E21B 43/16;
(Continued)

(56) References Cited

U.S. PATENT DOCUMENTS 2,784,294 A    3/1957   Gravert
2,898,441 A    8/1959   Reed et al.
(Continued)

FOREIGN PATENT DOCUMENTS

CN    101905196 A    12/2010
CN    202224255 U    5/2012
(Continued)

OTHER PUBLICATIONS

Belani, A., "It's Time for an Industry Initiative on Heavy Oil," JPT Online accessed on Oct. 16, 2007 at http://www.spe.org/spe-app/spe/jpt/2006/06/mangement_heavy_oil.htm.
(Continued)

*Primary Examiner* — Xiuyu Tai
(74) *Attorney, Agent, or Firm* — Daniel J. Chalker; Edwin S. Flores; Chalker Flores, LLP

(57) ABSTRACT

A system, method and apparatus for creating an electric glow discharge includes a non-conductive housing having a longitudinal axis, a first opening aligned with the longitudinal axis, and a second opening aligned with the longitudinal axis and opposite the first opening, a first electrically conductive screen disposed proximate to the first opening of the housing and substantially perpendicular to the longitudinal axis, a second electrically conductive screen disposed proximate to the second opening of the housing and substantially perpendicular to the longitudinal axis, wherein the second electrically conductive screen separated from the first electrically conductive screen by a substantially equidistant gap, a non-conductive granular material disposed within the substantially equidistant gap, and the electric glow discharge is created whenever the first electrically conductive screen has a first polarity, the second electrically conductive screen has a second polarity, and an electrically
(Continued)

conductive fluid is introduced into the substantially equidistant gap.

39 Claims, 7 Drawing Sheets

Related U.S. Application Data which is a continuation of application No. 14/704,538, filed on May 5, 2015, now Pat. No. 9,644,465, which is a continuation of application No. 12/288,170, filed on Oct. 16, 2008, now Pat. No. 9,051,820.

(60) Provisional application No. 61/028,386, filed on Feb. 13, 2008, provisional application No. 60/980,443, filed on Oct. 16, 2007.

(51) Int. Cl.
| | |
|---|---|
| *E21B 43/24* | (2006.01) |
| *E21B 36/04* | (2006.01) |
| *E21B 43/17* | (2006.01) |
| *E21B 43/243* | (2006.01) |
| *E21B 36/00* | (2006.01) |
| *C10B 23/00* | (2006.01) |
| *C10B 53/06* | (2006.01) |
| *E21B 43/16* | (2006.01) |
| *E21B 43/00* | (2006.01) |
| *H05H 1/24* | (2006.01) |

(52) U.S. Cl.
CPC .............. *E21B 36/04* (2013.01); *E21B 43/00* (2013.01); *E21B 43/08* (2013.01); *E21B 43/082* (2013.01); *E21B 43/16* (2013.01); *E21B 43/164* (2013.01); *E21B 43/17* (2013.01); *E21B 43/2401* (2013.01); *E21B 43/243* (2013.01); *E21B 43/2405* (2013.01); *E21B 43/2408* (2013.01); *H05H 1/4697* (2021.05); *B01J 2219/0809* (2013.01); *B01J 2219/0847* (2013.01); *H05H 1/2406* (2013.01)

(58) Field of Classification Search
CPC .... E21B 43/164; E21B 43/17; E21B 43/2401; E21B 43/2405; E21B 43/2408; E21B 43/243; B01J 19/088; B01J 2219/0809; B01J 2219/0847; B01J 2219/0894; H05H 1/4697; H05H 1/2406; C10B 23/00; C10B 53/06; C02F 1/4608; C02F 3/12; C02F 1/48; C02F 5/00; C02F 2303/22; C02F 2301/024; C02F 1/78; C02F 1/4672; C02F 1/46114; Y10S 210/908; C01B 2201/10; C01B 13/11; C01B 2201/22; C01B 2201/70; C01B 2201/24; Y02W 10/10; F15D 1/14

See application file for complete search history.

(56) References Cited

U.S. PATENT DOCUMENTS

| | | | |
|---|---|---|---|
| 2,923,809 A | 2/1960 | Clews et al. | |
| 3,004,189 A | 10/1961 | Giannini | |
| 3,082,314 A | 3/1963 | Arata et al. | |
| 3,131,288 A | 4/1964 | Browning et al. | |
| 3,242,305 A | 3/1966 | Kane et al. | |
| 3,342,746 A | 9/1967 | Seuthe | |
| 3,522,846 A | 8/1970 | New | |
| 3,534,388 A | 10/1970 | Ito et al. | |
| 3,567,898 A | 3/1971 | Fein | |
| 3,619,549 A | 11/1971 | Hogan et al. | |
| 3,641,308 A | 2/1972 | Couch, Jr. et al. | |
| 3,787,247 A | 1/1974 | Couch, Jr. | |
| 3,798,784 A | 3/1974 | Kovats et al. | |
| 3,830,428 A | 8/1974 | Dyos | |
| 3,833,787 A | 9/1974 | Couch, Jr. | |
| 3,943,330 A | 3/1976 | Pollock et al. | |
| 3,987,306 A * | 10/1976 | Simpson | H01J 61/28 |
| | | | 250/492.1 |
| 4,067,390 A | 1/1978 | Camacho et al. | |
| 4,169,503 A | 10/1979 | Scott | |
| 4,203,022 A | 5/1980 | Couch, Jr. et al. | |
| 4,265,747 A | 5/1981 | Copa et al. | |
| 4,311,897 A | 1/1982 | Yerushalmy | |
| 4,344,839 A | 8/1982 | Pachkowski et al. | |
| 4,351,734 A * | 9/1982 | Kauffman | C01B 13/11 |
| | | | 210/908 |
| 4,463,245 A | 7/1984 | McNeil | |
| 4,531,043 A | 7/1985 | Zverina et al. | |
| 4,567,346 A | 1/1986 | Marhic | |
| 4,624,765 A | 11/1986 | Cerkanowicz et al. | |
| 4,685,963 A | 8/1987 | Saville et al. | |
| 4,776,638 A | 10/1988 | Hahn | |
| 4,791,268 A | 12/1988 | Sanders et al. | |
| 4,886,118 A | 12/1989 | Van Meurs et al. | |
| 5,019,268 A | 5/1991 | Rogalla | |
| 5,048,404 A | 9/1991 | Bushnell et al. | |
| 5,082,054 A | 1/1992 | Kiamanesh | |
| 5,132,512 A | 7/1992 | Sanders et al. | |
| 5,149,399 A | 9/1992 | Kishi et al. | |
| 5,166,950 A | 11/1992 | Jouvaud et al. | |
| 5,326,530 A | 7/1994 | Bridges | |
| 5,348,629 A | 9/1994 | Khudenko | |
| 5,368,724 A | 11/1994 | Ayres et al. | |
| 5,440,667 A | 8/1995 | Simpson et al. | |
| 5,534,232 A | 7/1996 | Denes et al. | |
| 5,609,736 A | 3/1997 | Yamamoto | |
| 5,609,777 A | 3/1997 | Apunevich et al. | |
| 5,628,887 A | 5/1997 | Patterson et al. | |
| 5,655,210 A | 8/1997 | Gregoire et al. | |
| 5,660,743 A | 8/1997 | Nemchinsky | |
| 5,695,644 A * | 12/1997 | Buchanan | C02F 1/48 |
| | | | 204/554 |
| 5,738,170 A | 4/1998 | Laverhne | |
| 5,746,984 A | 5/1998 | Hoard | |
| 5,760,363 A | 6/1998 | Hackett et al. | |
| 5,766,447 A | 6/1998 | Creijghton | |
| 5,876,663 A | 3/1999 | Laroussi | |
| 5,879,555 A | 3/1999 | Khudenko | |
| 5,893,979 A | 4/1999 | Held | |
| 5,908,539 A | 6/1999 | Young et al. | |
| 5,979,551 A | 11/1999 | Uban et al. | |
| 6,007,681 A | 12/1999 | Kawamura et al. | |
| 6,096,222 A | 8/2000 | Wursburger et al. | |
| 6,117,401 A | 9/2000 | Juvan | |
| 6,228,266 B1 | 5/2001 | Shim | |
| 6,514,469 B1 | 2/2003 | Kado et al. | |
| 6,749,759 B2 | 6/2004 | Denes et al. | |
| 6,814,840 B2 | 11/2004 | Henuset et al. | |
| 6,929,067 B2 | 8/2005 | Vinegar et al. | |
| 6,942,786 B1 | 9/2005 | Fosseng | |
| 6,987,792 B2 | 1/2006 | Do et al. | |
| 7,081,171 B1 | 7/2006 | Sabol et al. | |
| 7,086,468 B2 | 8/2006 | De Rouffignac et al. | |
| 7,096,953 B2 | 8/2006 | De Rouffignac et al. | |
| 7,121,342 B2 | 10/2006 | Vinegar et al. | |
| 7,128,816 B2 | 10/2006 | Denes et al. | |
| 7,536,975 B2 | 5/2009 | Denes et al. | |
| 7,893,408 B2 | 2/2011 | Hieftje et al. | |
| 8,074,439 B2 | 12/2011 | Foret | |
| 8,278,810 B2 | 10/2012 | Foret | |
| 8,324,523 B2 | 12/2012 | Foret | |
| 8,568,663 B2 | 10/2013 | Foret | |
| 8,810,122 B2 | 8/2014 | Foret | |
| 8,833,054 B2 | 9/2014 | Foret | |
| 8,904,749 B2 | 12/2014 | Foret | |
| 9,051,820 B2 | 6/2015 | Foret | |
| 9,105,433 B2 | 8/2015 | Foret | |
| 9,111,712 B2 | 8/2015 | Foret | |
| 9,163,584 B2 | 10/2015 | Foret | |
| 9,185,787 B2 | 11/2015 | Foret | |

(56) References Cited

U.S. PATENT DOCUMENTS

| | | |
|---|---|---|
| 9,230,777 B2 | 1/2016 | Foret |
| 9,241,396 B2 | 1/2016 | Foret |
| 9,445,488 B2 | 9/2016 | Foret |
| 9,499,443 B2 | 11/2016 | Foret |
| 9,516,736 B2 | 12/2016 | Foret |
| 9,560,731 B2 | 1/2017 | Foret |
| 9,644,465 B2 | 5/2017 | Foret |
| 9,699,879 B2 | 7/2017 | Foret |
| 9,761,413 B2 | 9/2017 | Foret |
| 9,781,817 B2 | 10/2017 | Foret |
| 9,790,108 B2 | 10/2017 | Foret |
| 9,801,266 B2 | 10/2017 | Foret |
| 2002/0148562 A1 | 10/2002 | Aoyagi et al. |
| 2003/0101936 A1 | 6/2003 | Lee |
| 2003/0150325 A1 | 8/2003 | Hyppanen |
| 2003/0179536 A1 | 9/2003 | Stevenson et al. |
| 2003/0213604 A1 | 11/2003 | Stevenson et al. |
| 2004/0020188 A1 | 2/2004 | Kramer et al. |
| 2005/0087435 A1 | 4/2005 | Kong et al. |
| 2005/0151455 A1 | 7/2005 | Sato et al. |
| 2005/0155373 A1 | 7/2005 | Hirooka et al. |
| 2006/0104849 A1 | 5/2006 | Tada et al. |
| 2006/0124445 A1 | 6/2006 | Labrecque |
| 2006/0151445 A1 | 7/2006 | Schneider |
| 2006/0196424 A1 | 9/2006 | Swallow et al. |
| 2007/0104610 A1 | 5/2007 | Houston et al. |
| 2007/0196249 A1 | 8/2007 | Fridman |
| 2008/0058228 A1 | 3/2008 | Wilson |
| 2008/0131103 A1 | 6/2008 | Nordmann |
| 2008/0202915 A1 | 8/2008 | Hieftje et al. |
| 2009/0118145 A1 | 5/2009 | Wilson et al. |
| 2010/0212498 A1 | 8/2010 | Salazar |
| 2010/0258429 A1 | 10/2010 | Ugolin |
| 2010/0296977 A1 | 11/2010 | Hancock |
| 2011/0005999 A1 | 1/2011 | Randal |
| 2011/0022043 A1 | 1/2011 | Wandke et al. |
| 2011/0031224 A1 | 2/2011 | Severance, Jr. et al. |
| 2011/0223091 A1 | 9/2011 | Miller |
| 2011/0225948 A1 | 9/2011 | Valeev et al. |
| 2012/0205293 A1 | 8/2012 | Thanoo |
| 2012/0227968 A1 | 9/2012 | Eldred et al. |
| 2014/0238861 A1 | 8/2014 | Foret |
| 2014/0260179 A1 | 9/2014 | Foret |
| 2015/0103860 A1 | 4/2015 | Foret |
| 2015/0323174 A1 | 11/2015 | Foret |
| 2015/0323175 A1 | 11/2015 | Foret |
| 2016/0280608 A1 | 9/2016 | Foret |
| 2016/0307733 A1 | 10/2016 | Foret |
| 2017/0037307 A1 | 2/2017 | Foret |
| 2017/0111985 A1 | 4/2017 | Foret |
| 2017/0135191 A1 | 5/2017 | Foret |
| 2017/0211360 A1 | 7/2017 | Foret |

FOREIGN PATENT DOCUMENTS

| | | |
|---|---|---|
| EP | 1707096 A2 | 10/2006 |
| EP | 1915940 A1 | 4/2008 |
| GB | 1224638 A | 3/1971 |
| JP | 2006-501980 A | 1/2006 |
| JP | 2008238053 A | 10/2008 |
| KR | 101999009569 A | 2/1999 |
| KR | 10-2004-0005107 A | 1/2004 |
| WO | 9904607 A1 | 1/1999 |
| WO | 2007117634 A2 | 10/2007 |

OTHER PUBLICATIONS

Brandt, A. R., "Converting Green River oil shale to liquid fuels with Alberta Taciuk Processor: energy inputs and greenhouse gas emissions," Jun. 1, 2007.

Brandt, A. R., "Converting Green River oil shale to liquid fuels with the Shell in-situ conversion process: energy inputs and greenhouse gas emissions," Jun. 30, 2007.

Extended European Search Report for EP 08840081.7 dated May 28, 2014.

Extended European Search Report for EP 09710927.6 dated Jan. 21, 2014.

Extended European Search Report for EP 14764029.6 dated Dec. 14, 2015.

International Search Report and Written Opinion for PCT/US2008/011926 dated Apr. 27, 2009.

International Search Report and Written Opinion for PCT/US2009/000937 dated Sep. 17, 2009.

International Search Report and Written Opinion for PCT/US2009/033979 dated Sep. 15, 2009.

International Search Report and Written Opinion for PCT/US2014/030090 dated Sep. 25, 2014.

International Search Report and Written Opinion for PCT/US2014/062941 dated Jan. 27, 2014.

Kavan, L., "Electrochemical Carbon," Chem Rev (1997), 97:3061-3082.

"Metalliferous Mining—Processing Cyclones Resource Book—Aug. 2010, provided athttps://rsteyn.files.wordpress.com/2010/07/cyclones-basics.pdf".

Understanding in-situ combustion, www.HeavyOilinfo.com, accessed Oct. 16, 2007.

Unleashing the potential: Heavy Oil, Supplement to E&P Annual Reference Guide, www.eandp.info.com, Jun. 2007.

\* cited by examiner

SYSTEM, METHOD AND APPARATUS FOR CREATING AN ELECTRICAL GLOW DISCHARGE

PRIORITY CLAIM AND CROSS-REFERENCE TO RELATED APPLICATIONS

This patent application is a continuation-in-part patent application of U.S. patent application Ser. No. 15/480,468 filed on Apr. 6, 2017 and entitled "System, Method and Apparatus for Creating an Electrical Glow Discharge", now U.S. Pat. No. 10,184,322, which is a continuation patent application of U.S. patent application Ser. No. 14/704,538 filed on May 5, 2015 and entitled "System, Method and Apparatus for Creating an Electrical Glow Discharge, now U.S. Pat. No. 9,644,465, which is a continuation patent application of U.S. patent application Ser. No. 12/288,170 filed on Oct. 16, 2008 and entitled "System, Method and Apparatus for Creating an Electrical Glow Discharge", now U.S. Pat. No. 9,051,820, which is non-provisional patent application of: (1) U.S. provisional patent application 60/980,443 filed on Oct. 16, 2007 and entitled "System, Method and Apparatus for Carbonizing Oil Shale with Electrolysis Plasma Well Screen"; and (2) U.S. provisional patent application 61/028,386 filed on Feb. 13, 2008 and entitled "High Temperature Plasma Electrolysis Reactor Configured as an Evaporator, Filter, Heater or Torch." All of the foregoing applications are hereby incorporated by reference in their entirety.

FIELD OF THE INVENTION

The present invention relates to the field of treating fluids using an electrical glow discharge.

BACKGROUND OF THE INVENTION

There are many problems associated with the production of oil and gas resources. For example, it is very common for oil production wells to reach the end of their life, while there is still a substantial amount of oil in place (OIP) within the formation. Engineers may then to decide whether to shut in the well or stimulate the well using enhanced oil recovery (EOR) methods ranging from water flooding to steam flooding to injection of carbon dioxide and injection of solvents.

Likewise, even during peak production of a well, a well may have to be shut in due to paraffin plugging the production tubing. This can cause several problems ranging from reduced production to parting or breaking of the sucker rod connected to the surface pump jack.

Another problem associated with most oil and gas wells is produced water. When the water reaches the surface it is separated from the oil or gas and then must be treated prior to final disposition.

Recently, primarily due to high crude oil prices many exploration companies are turning to unconventional heavy oil resources (API<22) such as oil sand bitumen, oil shale kerogen as well as heavy oil itself. Canada contains the largest known oil sand reserves estimated at over 1 trillion recoverable barrels of bitumen. Likewise, the largest known unconventional petroleum or hydrocarbon resource can be found in the Green River Formation in Colorado, Wyoming and Utah. Worldwide oil shale reserves are estimated around 2.9-3.3 trillion barrels of shale oil while the Green River Formation reserves alone are estimated to contain between 1.5-2.6 trillion barrels.

However, emerging issues with respect to the renewed interest in oil shale development range from water resources, to green house gas emissions to basic infrastructure needs. Likewise, the Canadian oil sands has its own problems ranging from very large tailings ponds to a lack of upgrading capacity for the bitumen recovered from the oil sands. In addition, the steam assisted gravity drainage (SAGD) process utilizes copious amounts of energy to produce steam. Two problems associated with producing steam are first the source of water and removing its contaminants that may be deposited upon boiler tube walls and second recovering the latent heat within the steam when injected downhole.

Likewise, there are many proponents suggesting $CO_2$ injection as means for recovering heavy oil, oil sand and oil shale. As recently as Apr. 4, 2007 Schlumberger's scientific advisor on $CO_2$, T. S. (Rama) Ramakrishnan has stated, "The research for efficient heavy oil recovery is still wide open. Steam flooding is the tried and trusted method, but we need to move forward. Having said that, I do not think advances will come about by refining current practices or expanding an existing research pilot—we need a step-change vis-à-vis enhancing heavy oil recovery. Oil at $60/bbl should be enough to provide the impetus."

Shell Oil Company has been demonstrating its freeze-wall and in situ conversion process (ICP) for recovering kerogen from the Green River Formation located in Colorado's Piceance Basin. Although Shell has patented various aspects of the process, two of the impediments to large volume production of oil shale using ICP are the type of downhole heater and the formation's constituents. U.S. Pat. No. 7,086,468 and the family of other patents and published patent applications based on U.S. Provisional Patent Application Nos. 60/199,213 (Apr. 24, 2000), 60/199,214 (Apr. 24, 2000) and 60/199,215 (Apr. 24, 2000) provide detailed descriptions of the various prior art aboveground and in situ methods of retorting oil shale, all of which are hereby incorporated by reference in their entirety. Moreover, updated information regarding aboveground and in situ methods of retorting oil shale in the Green River Formation are described in "Converting Green River oil shale to liquid fuels with Alberta Taciuk Processor: energy inputs and greenhouse gas emissions" by Adam R Brandt (Jun. 1, 2007) and "Converting Green River oil shale to liquid fuels with the Shell in-situ conversion process: energy inputs and greenhouse gas emissions" by Adam R Brandt (Jun. 30, 2007), both of which are available at http://abrandt-.berkeley.edu/shale/shale.html and are hereby incorporated by reference in their entirety.

What is unique about the Green River Formation oil shale is that it has a high content of Nahcolite. Nahcolite is commonly referred to as baking soda which is sodium bicarbonate ($NaHCO_3$). Another active player in oil shale development, ExxonMobil, has developed an in situ conversion process for oil shale that is rich in Nahcolite. The process incorporates recovering kerogen while converting sodium bicarbonate or Nahcolite to sodium carbonate. ExxonMobil claims that the pyrolysis of the oil shale should enhance leaching and removal of sodium carbonate during solution mining.

Now, returning back to Shell's ICP for oil shale, the two largest problems to overcome are that baking soda can be used as a heating insulator and that oil shale is not very permeable. Thus using conventional heat transfer methods such as conduction and convection require a long period of time in addition to drilling many wells and incorporating many heaters close to one another.

Although in situ processes are rapidly developing for both oil shale and oil sands, surface processing is currently the leader for oil sands. Retorting of oil shale has been around since the early 1970's. Recently, retorting has been applied to oil sands. Once again the major problem with retorting either oil sand or oil shale is that the minerals and metals act to retard heat transfer. However, the single largest difference between oil shale and oil sand is that sodium carbonate is a known electrolyte. Likewise, oil sand contains electrolytes in the form of other salts.

While melting oil shale in a carbon crucible the inventor of the present invention has recently unexpectedly discovered a method for carbonizing oil shale with plasma electrolysis while simultaneously separating solids, liquids and gases. The process is based upon using the same mineral that is widespread in the Green River Formation—Baking Soda.

SUMMARY OF THE INVENTION

The present invention provides an apparatus for creating an electric glow discharge comprising: a non-conductive housing having a longitudinal axis, a first opening aligned with the longitudinal axis, and a second opening aligned with the longitudinal axis and opposite the first opening; a first electrically conductive screen disposed proximate to the first opening of the housing and substantially perpendicular to the longitudinal axis; a second electrically conductive screen disposed proximate to the second opening of the housing and substantially perpendicular to the longitudinal axis, wherein the second electrically conductive screen separated from the first electrically conductive screen by a substantially equidistant gap; a non-conductive granular material disposed within the substantially equidistant gap; a first electrical terminal electrically connected to the first electrically conductive screen and disposed on an exterior of the housing; a second electrical terminal electrically connected to the second electrically conductive screen and disposed on an exterior of the housing; and wherein the electric glow discharge is created whenever the first electrical terminal is connected to an electrical power supply such that the first electrically conductive screen has a first polarity, the second electrical terminal is connected to the electrical power supply such that the second electrically conductive screen has a second polarity, and an electrically conductive fluid is introduced into the substantially equidistant gap.

In one aspect, the non-conductive granular material (a) does not pass through either electrically conductive screen, (b) allows the electrically conductive fluid to flow between the first electrically conductive screen and the second electrically conductive screen, and (c) prevents electrical arcing between the electrically conductive screens during the electric glow discharge. In another aspect, the non-conductive granular material comprises marbles, ceramic beads, molecular sieve media, sand, limestone, activated carbon, zeolite, zirconium, alumina, rock salt, nut shell or wood chips. In another aspect, an electrical power supply is electrically connected to the first and second electrical terminals. In another aspect, the electrical power supply operates in a range from 50 to 500 volts DC, or 200 to 400 volts DC. In another aspect, the first electrically conductive screen or the second electrically conductive screen reaches a temperature of at least 500° C., 1000° C., or 2000° C. during the electric glow discharge. In another aspect, once the electric glow discharge is created, the electric glow discharge is maintained without the electrically conductive fluid. In another aspect, the electrically conductive fluid comprises water, produced water, wastewater or tailings pond water. In another aspect, the electrically conductive fluid comprises a fluid containing an electrolyte. In another aspect, the electrolyte comprises baking soda, Nahcolite, lime, sodium chloride, ammonium sulfate, sodium sulfate or carbonic acid. In another aspect, the apparatus is configured for installation within a fluid transfer device comprising a tank, vessel, stripper column, reactor, pipe or conduit. In another aspect, the apparatus further comprises a fluid transfer device having a first flange and a second flange, wherein the fluid transfer device comprising a tank, vessel, stripper column, reactor, pipe or conduit; and the housing is attached between the first flange and the second flange. In another aspect, the apparatus comprises one or more sensors disposed within the housing. In another aspect, the first and second conductive filter screens or the non-conductive granular material are removably disposed within the housing.

In addition, the present invention provides a system for creating an electric glow discharge comprising: a fluid transfer device having one or more sets of first flanges and second flanges, wherein the fluid transfer device comprising a tank, vessel, stripper column, reactor, pipe or conduit; an electric glow discharge device attached between each set first flanges and second flanges, where each electric glow discharge device comprises: a non-conductive housing having a longitudinal axis, a first opening aligned with the longitudinal axis, and a second opening aligned with the longitudinal axis and opposite the first opening, a first electrically conductive screen disposed proximate to the first opening of the housing and substantially perpendicular to the longitudinal axis, a second electrically conductive screen disposed proximate to the second opening of the housing and substantially perpendicular to the longitudinal axis, wherein the second electrically conductive screen separated from the first electrically conductive screen by a substantially equidistant gap, a non-conductive granular material disposed within the substantially equidistant gap, a first electrical terminal electrically connected to the first electrically conductive screen and disposed on an exterior of the housing, and a second electrical terminal electrically connected to the second electrically conductive screen and disposed on an exterior of the housing; an electrical power source electrically connected to the first and second electrical terminals; and wherein the electric glow discharge is created whenever the first electrical terminal is connected to an electrical power supply such that the first electrically conductive screen has a first polarity, the second electrical terminal is connected to the electrical power supply such that the second electrically conductive screen has a second polarity, and an electrically conductive fluid is introduced into the substantially equidistant gap.

In one aspect, the non-conductive granular material (a) does not pass through either electrically conductive screen, (b) allows the electrically conductive fluid to flow between the first electrically conductive screen and the second electrically conductive screen, and (c) prevents electrical arcing between the electrically conductive screens during the electric glow discharge. In another aspect, the non-conductive granular material comprises marbles, ceramic beads, molecular sieve media, sand, limestone, activated carbon, zeolite, zirconium, alumina, rock salt, nut shell or wood chips. In another aspect, the electrical power supply operates in a range from 50 to 500 volts DC, or 200 to 400 volts DC. In another aspect, the first electrically conductive screen or the second electrically conductive screen reaches a temperature of at least 500° C., 1000° C., or 2000° C. during the electric glow discharge. In another aspect, once the electric glow discharge is created, the electric glow discharge is maintained without the electrically conductive fluid. In another aspect, the electrically conductive fluid comprises water, produced water, wastewater or tailings pond water. In another aspect, the electrically conductive fluid comprises a fluid containing an electrolyte. In another aspect, the electrolyte comprises baking soda, Nahcolite, lime, sodium chloride, ammonium sulfate, sodium sulfate or carbonic acid. In another aspect, the system further comprises one or more sensors disposed within the housing. In another aspect, the first and second conductive filter screens or the non-conductive granular material are removably disposed within the housing.

Moreover, the present invention provides a method for creating an electric glow discharge by providing a glow discharge apparatus comprising: a non-conductive housing having a longitudinal axis, a first opening aligned with the longitudinal axis, and a second opening aligned with the longitudinal axis and opposite the first opening, a first electrically conductive screen disposed proximate to the first opening of the housing and substantially perpendicular to the longitudinal axis, a second electrically conductive screen disposed proximate to the second opening of the housing and substantially perpendicular to the longitudinal axis, wherein the second electrically conductive screen separated from the first electrically conductive screen by a substantially equidistant gap, a non-conductive granular material disposed within the substantially equidistant gap, a first electrical terminal electrically connected to the first electrically conductive screen and disposed on an exterior of the housing, and a second electrical terminal electrically connected to the second electrically conductive screen and disposed on an exterior of the housing; connecting the first and second electrical terminals to an electrical power supply such that the first electrically conductive screen has a first polarity, and the second electrically conductive screen has a second polarity; and creating the electric glow discharge by introducing an electrically conductive fluid into the substantially equidistant gap. The aspects described above with respect to the apparatus and system are also applicable to the method.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

It will be understood that the terms plasma electrolysis, glow discharge, glow discharge plasma and electrochemical plasma will be used interchangeably throughout this disclosure. Likewise, it will be understood that plasma electrolysis is substantially different and clearly differentiated within the art from traditional electrolysis or simple electrochemical reactions commonly referred to as REDOX (reduction oxidation) reactions. In plasma electrolysis a "plasma" is formed and maintained around the cathode which is surrounded by an electrolyte thus allowing for high temperature reactions such as gasification, cracking, thermolysis and pyrolysis to occur at or near the plasma interface. The circuit is thus completed from the cathode through the plasma and into the bulk liquid.

Figure 1:
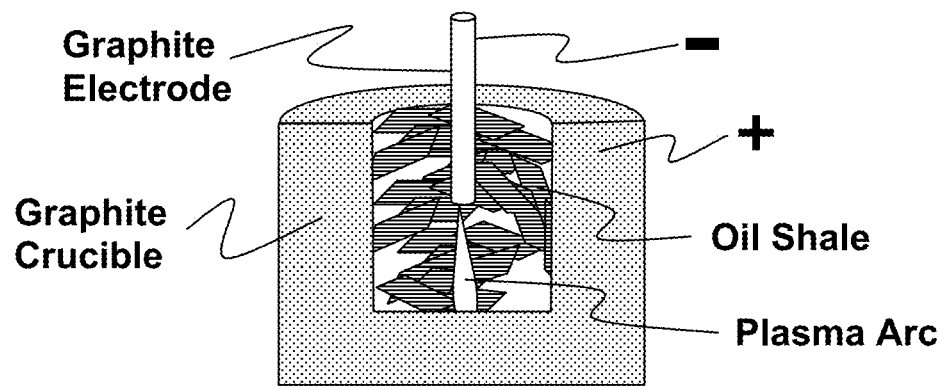
FIG. 1 is a cross-sectional view of the ARCWHIRL™ Melter Crucible in accordance with on embodiment of the present invention.
Figure 2:
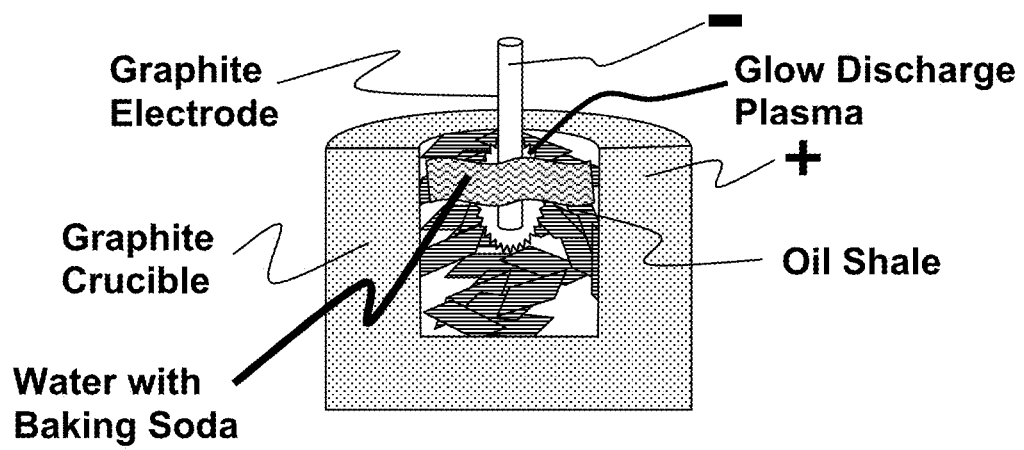
FIG. 2 is a cross-sectional view of the ARCWHIRL™ Melter Crucible carbonizing oil shale with plasma electrolysis in accordance with on embodiment of the present invention.

Turning now to FIG. 1, the inventor of the present invention melted a virgin sample of oil shale utilizing a carbon crucible operated in a plasma arc melting mode. Later and being very familiar with plasma electrolysis or glow discharge plasma, specifically using baking soda as the electrolyte, the inventor of the present invention, filled the same crucible with oil shale then mixed baking soda into water then filled the crucible with water as shown in FIG. 2.

The DC power supply was operated at 300 volts DC in order to get the electrically conductive water and baking soda solution (an ionic liquid or electrolyte) to arc over and form a glow discharge irradiating from the negative (−) graphite electrode. Within seconds the glow discharge, also commonly referred to as electrochemical plasma or plasma electrolysis was formed around the negative (−) cathode graphite electrode.

The plasma electrolysis cell was operated for one minute. The cathode was extracted from the cell and the carbon was glowing orange hot. The estimated surface temperature on the carbon cathode ranged from 1,000° C. to over 2,000° C. The color of the glow discharge plasma was orange. This is very typical of the emission spectra of a high pressure sodium lamp commonly found in street lights. Hence the use of baking soda, sodium hydrogen carbonate, which caused the orange plasma glow discharge.

The cell was shut down and allowed to cool. Immediately upon removing a piece of oil shale from the crucible a noticeable color change occurred on the outside of the normally grey oil shale. The shale was completely black. All the pieces of shale were covered in a black coke like substance. What occurred next was completely unexpected after crushing a piece of plasma electrolysis treated oil shale. The shale was internally carbonized up to ½ inch from the surface.

This simple procedure opens the door to a new process for enhanced recovery of unconventional fossil fuels such as heavy oil, oil sands and oil shale. Referring again to FIG. 2—Carbonizing Oil Shale with Plasma Electrolysis—the present invention can be applied to surface processing of oil shale or spent oil shale. Any retort can be retrofitted to operate in a plasma electrolysis mode. However, rotary washing screens commonly found in the mining industry as well as the agriculture industry can be retrofitted to operate in a continuous feed plasma electrolysis mode. The method of the present invention can be applied to oil sand also. This is a dramatic departure from traditional high temperature "DRY" retorting methods commonly applied within the oil shale industry. However, the plasma electrolysis method can be applied to the froth flotation step commonly employed within the oil sands industry. For the sake of simplicity, the remainder of this disclosure will provide a detailed explanation of the invention as applied to the carbonization of oil shale with plasma electrolysis.

Figure 3:
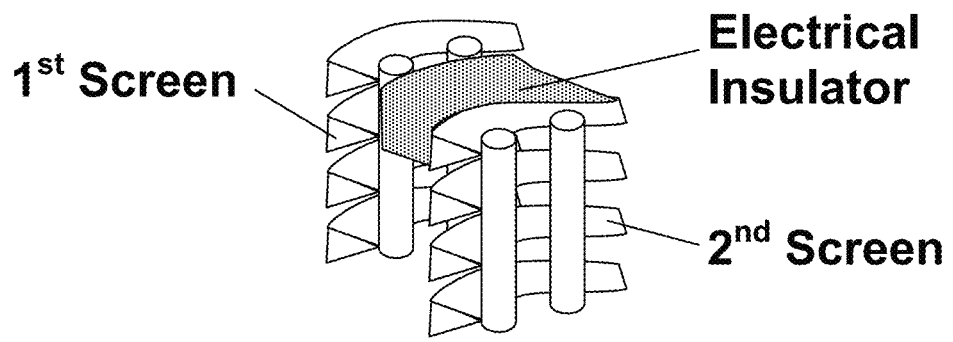
FIG. 3 is a cross-sectional view of a preferred embodiment of the invention showing a plasma electrolysis well screen in accordance with on embodiment of the present invention.
Figure 4:
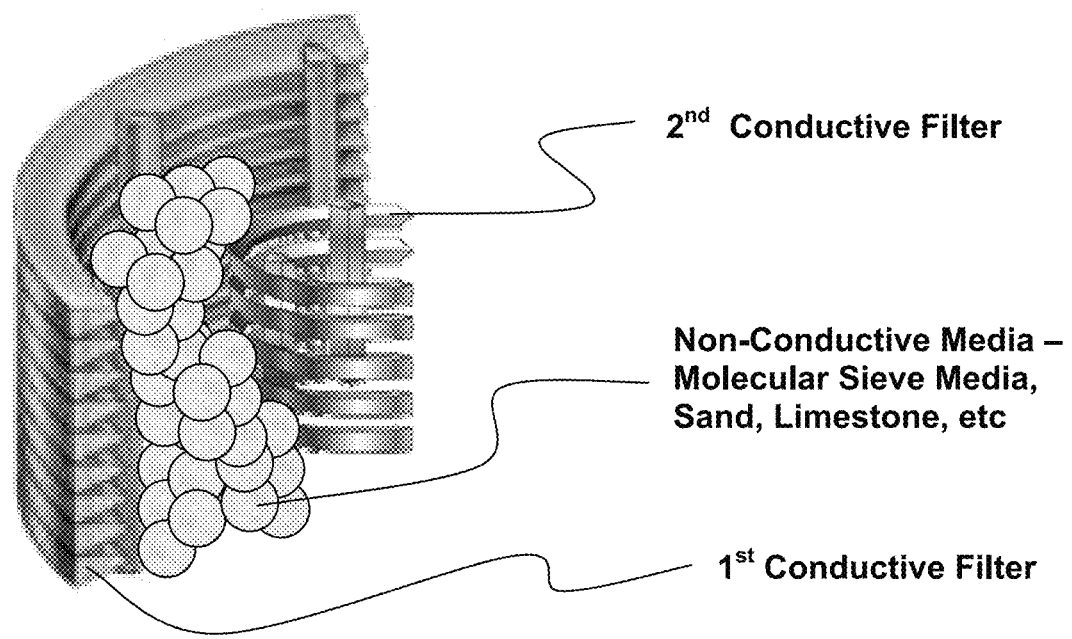
FIG. 4 is cross-sectional view of a HI-TEMPER™ Filter with non-conductive media in accordance with on embodiment of the present invention.

As shown in FIGS. 3 and 4, the present invention provides an apparatus for creating an electric glow discharge that includes a first electrically conductive screen, a second electrically conductive screen, one or more insulators attached to the first electrically conductive screen and the second electrically conductive screen, a non-conductive granular material disposed within the gap, a first electrical terminal electrically connected to the first electrically conductive screen, and a second electrical terminal electrically connected to the second electrically conductive screen. The insulator(s) maintain a substantially equidistant gap between the first electrically conductive screen and the second electrically conductive screen. The non-conductive granular material (a) does not pass through either electrically conductive screen, (b) allows an electrically conductive fluid to flow between the first electrically conductive screen and the second electrically conductive screen, and (c) prevents electrical arcing between the electrically conductive screens during the electric glow discharge. The electric glow discharge is created whenever: (a) the first electrical terminal is connected to an electrical power source such that the first electrically conductive screen is a cathode, the second electrical terminal is connected to the electrical power supply such that the second electrically conductive screen is an anode, and the electrically conductive fluid is introduced into the gap, or (b) the first electrical terminal and the second electrical terminal are both connected to the electrical power supply such that both electrically conductive screens are the cathode, and the electrically conductive fluid is introduced between both electrically conductive screens and an external anode connected to the electrical power supply.

The non-conductive granular material may include marbles, ceramic beads, molecular sieve media, sand, limestone, activated carbon, zeolite, zirconium, alumina, rock salt, nut shell or wood chips. The electrically conductive screens can be flat, tubular, elliptical, conical or curved. The apparatus can be installed within a conduit, pipeline, flow line, stripper column, reactor, a well or a well screen. In addition, the apparatus can be protected by a non-conductive rotating sleeve or a non-conductive screen. The electrical power supply can operate in a range from (a) 50 to 500 volts DC, or (b) 200 to 400 volts DC. The cathode can reach a temperature of (a) at least 500° C., (b) at least 1000° C., or (c) at least 2000° C. during the electric glow discharge. Note that once the electric glow discharge is created, the electric glow discharge is maintained without the electrically conductive fluid. The electrically conductive fluid can be water, produced water, wastewater or tailings pond water. An electrolyte, such as baking soda, Nahcolite, lime, sodium chloride, ammonium sulfate, sodium sulfate or carbonic acid, can be added to the electrically conductive fluid. The apparatus can be used as to heat or fracture a subterranean formation containing bitumen, kerogen or petroleum. The subterranean formation may contain oil shale or oil sand.

In addition, the present invention provides a method for creating an electric glow discharge by providing an electric glow apparatus, introducing an electrically conductive fluid into the gap, and connecting the electrical terminals to an electrical power supply such that the first electrically conductive screen is a cathode and the second electrically conductive screen is an anode. The electric glow discharge apparatus includes a first electrically conductive screen, a second electrically conductive screen, one or more insulators attached to the first electrically conductive screen and the second electrically conductive screen, a non-conductive granular material disposed within the gap, a first electrical terminal electrically connected to the first electrically conductive screen, and a second electrical terminal electrically connected to the second electrically conductive screen. The insulator(s) maintain a substantially equidistant gap between the first electrically conductive screen and the second electrically conductive screen. The non-conductive granular material (a) does not pass through either electrically conductive screen, (b) allows an electrically conductive fluid to flow between the first electrically conductive screen and the second electrically conductive screen, and (c) prevents electrical arcing between the electrically conductive screens during the electric glow discharge. The electric glow discharge is created whenever: (a) the first electrical terminal is connected to an electrical power source such that the first electrically conductive screen is a cathode, the second electrical terminal is connected to the electrical power supply such that the second electrically conductive screen is an anode, and the electrically conductive fluid is introduced into the gap, or (b) the first electrical terminal and the second electrical terminal are both connected to the electrical power supply such that both electrically conductive screens are the cathode, and the electrically conductive fluid is introduced between both electrically conductive screens and an external anode connected to the electrical power supply.

Moreover, the present invention provides a method for creating an electric glow discharge by providing an electric glow apparatus, introducing an electrically conductive fluid into the gap, connecting the electrical terminals to an electrical power supply such that the both electrically conductive screens are the cathode and the second electrically conductive screen is an anode, and connecting an external anode to the electrical power supply. The electric glow discharge apparatus includes a first electrically conductive screen, a second electrically conductive screen, one or more insulators attached to the first electrically conductive screen and the second electrically conductive screen, a non-conductive granular material disposed within the gap, a first electrical terminal electrically connected to the first electrically conductive screen, and a second electrical terminal electrically connected to the second electrically conductive screen. The insulator(s) maintain a substantially equidistant gap between the first electrically conductive screen and the second electrically conductive screen. The non-conductive granular material (a) does not pass through either electrically conductive screen, (b) allows an electrically conductive fluid to flow between the first electrically conductive screen and the second electrically conductive screen, and (c) prevents electrical arcing between the electrically conductive screens during the electric glow discharge. The electric glow discharge is created whenever: (a) the first electrical terminal is connected to an electrical power source such that the first electrically conductive screen is a cathode, the second electrical terminal is connected to the electrical power supply such that the second electrically conductive screen is an anode, and the electrically conductive fluid is introduced into the gap, or (b) the first electrical terminal and the second electrical terminal are both connected to the electrical power supply such that both electrically conductive screens are the cathode, and the electrically conductive fluid is introduced between both electrically conductive screens and an external anode connected to the electrical power supply.

The present invention also provides a system for creating an electric glow discharge that includes a power supply, a first electrically conductive screen, a second electrically conductive screen, one or more insulators attached to the first electrically conductive screen and the second electrically conductive screen, a non-conductive granular material disposed within the gap, a first electrical terminal electrically connected to the first electrically conductive screen, and a second electrical terminal electrically connected to the second electrically conductive screen. The insulator(s) maintain a substantially equidistant gap between the first electrically conductive screen and the second electrically conductive screen. The non-conductive granular material (a) does not pass through either electrically conductive screen, (b) allows an electrically conductive fluid to flow between the first electrically conductive screen and the second electrically conductive screen, and (c) prevents electrical arcing between the electrically conductive screens during the electric glow discharge. The electric glow discharge is created whenever: (a) the first electrical terminal is connected to an electrical power source such that the first electrically conductive screen is a cathode, the second electrical terminal is connected to the electrical power supply such that the second electrically conductive screen is an anode, and the electrically conductive fluid is introduced into the gap, or (b) the first electrical terminal and the second electrical terminal are both connected to the electrical power supply such that both electrically conductive screens are the cathode, and the electrically conductive fluid is introduced between both electrically conductive screens and an external anode connected to the electrical power supply.

Figure 5:
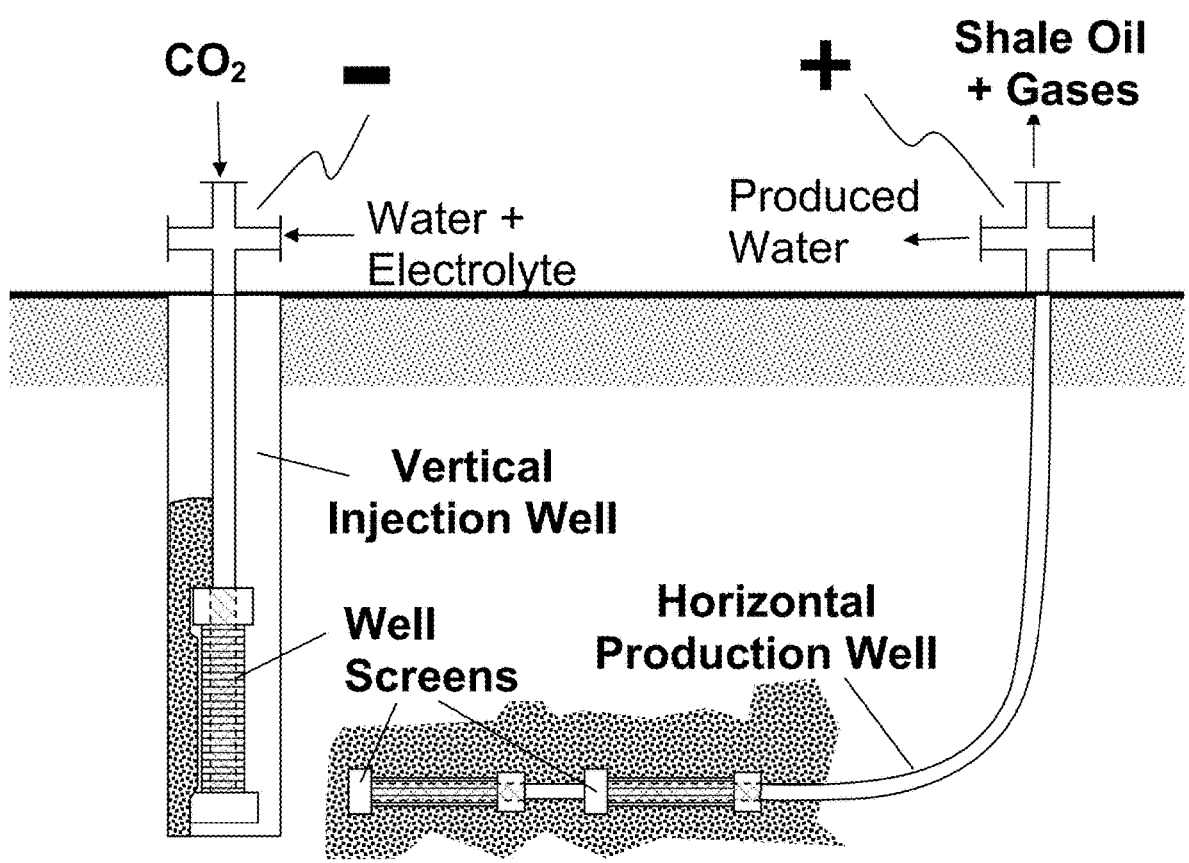
FIG. 5 is a cross-sectional view of a preferred embodiment of the invention showing a toe to heal Oil Shale Carbonizing with Plasma Electrolysis in accordance with on embodiment of the present invention.
Figure 6:
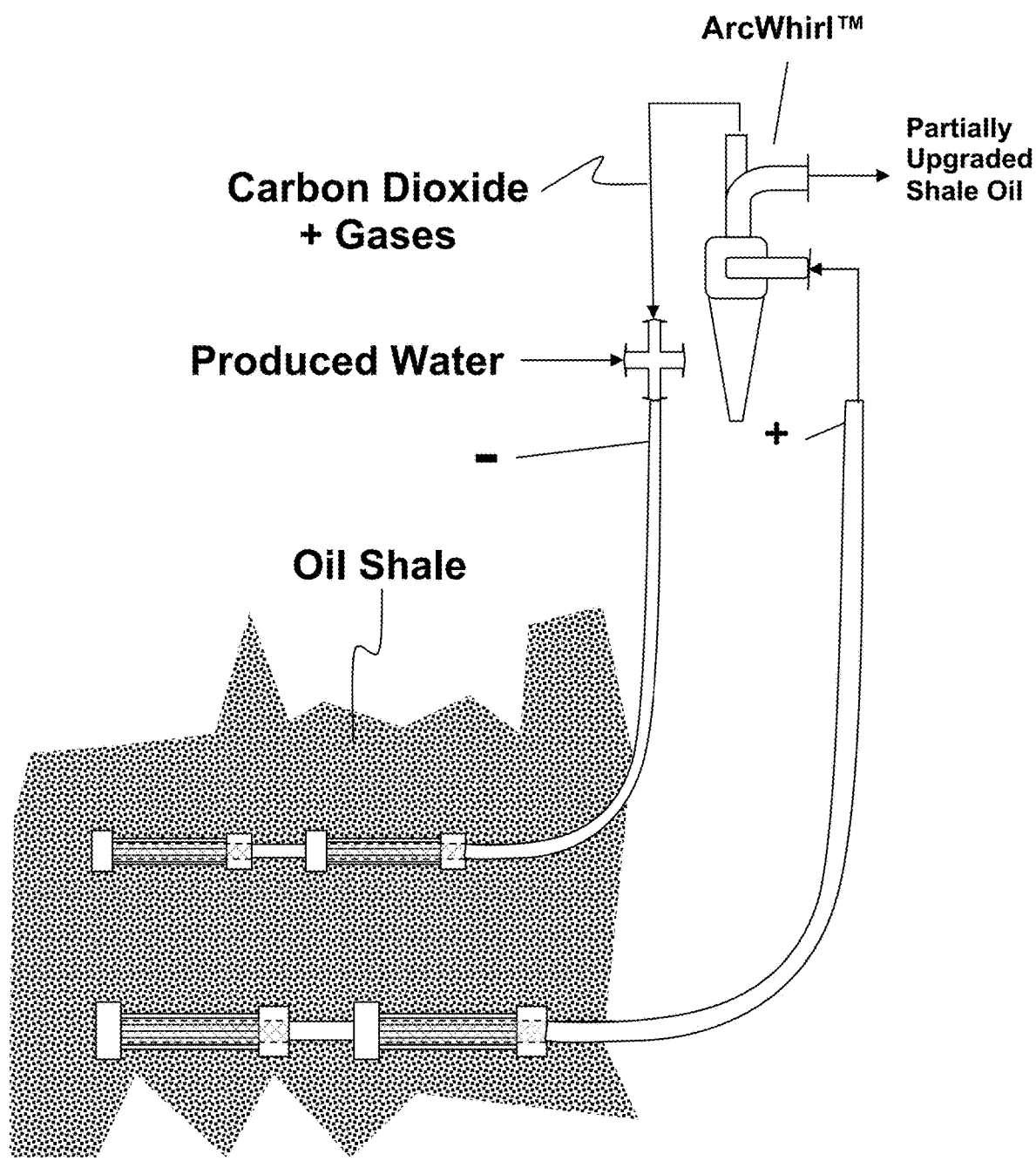
FIG. 6 is a cross-sectional view of a preferred embodiment of the invention showing horizontal wells for In Situ Oil Shale Carbonizing with Plasma Electrolysis in accordance with on embodiment of the present invention.
Figure 7:
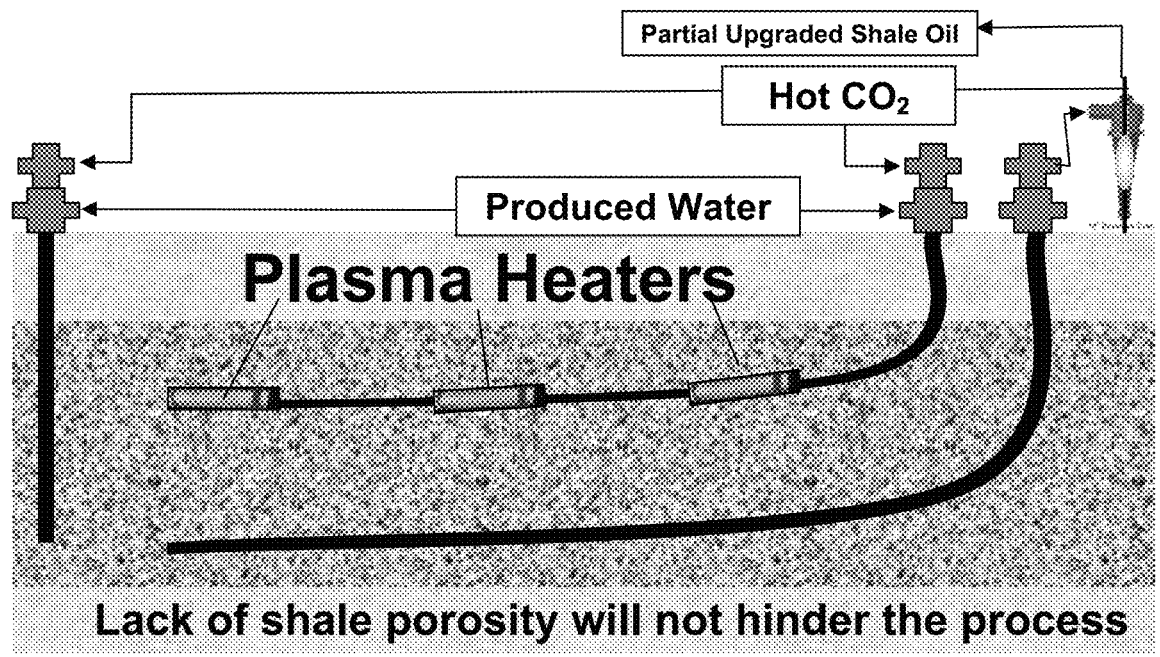
FIG. 7 is a cross-sectional view of a Insitu PAGD™ with ARCWHIRL™ in accordance with on embodiment of the present invention.
Figure 8:
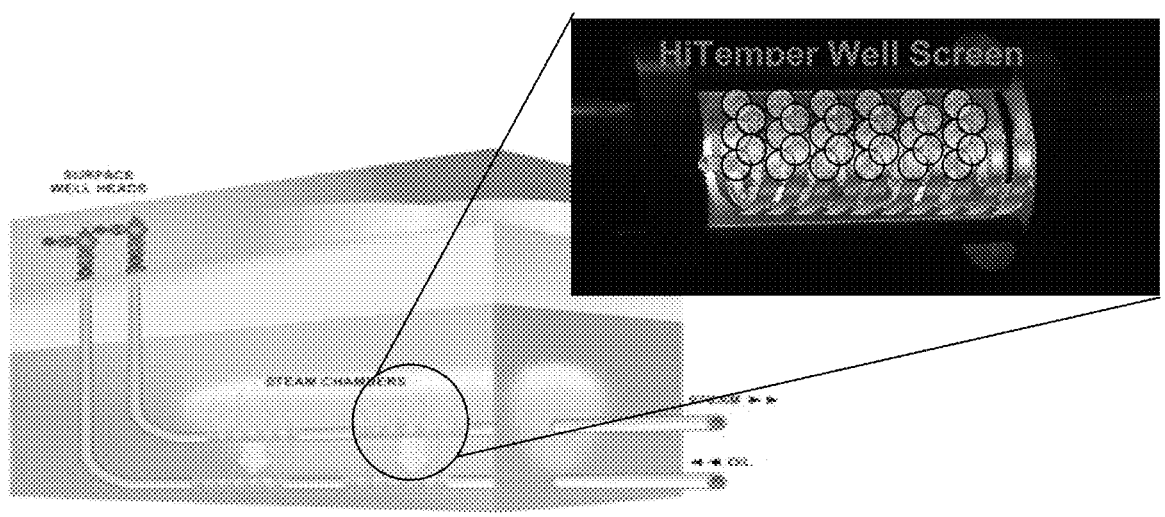
FIG. 8 is a cross-sectional view of a HI-TEMPER™ Well Screen Heater Treater in accordance with on embodiment of the present invention.

Turning now to FIG. 5—Toe to Heal Oil Shale Plasma Electrolysis, the conventional Enhanced Oil Recovery (EOR) with carbon dioxide ($CO_2$) method can be dramatically improved and is virtually a step-change from traditional $CO_2$ flooding. For example, the vertical injection well may be utilized as the cathode (−) while the horizontal production well may be utilized as the anode (+). On the surface a water source, for example, produced water, wastewater or tailings pond water is tested for conductivity in order to operate in a plasma electrolysis mode at a DC voltage ranging from 50 to 500 volts DC and more specifically between 200 and 400 volts DC. The conductivity may be increased by adding an electrolyte selected from Nahcolite (baking soda commonly found within oil shale formations), lime, sodium chloride, ammonium sulfate, sodium sulfate or carbonic acid formed from dissolving $CO_2$ into water.

In order to complete the electrical circuit between the vertical injection well and the horizontal production well, the horizontal well may be drilled such that a continuous bore is formed between both the vertical and horizontal wells. This is common for running a pipeline underneath a river or underneath a road. Whether the vertical well or horizontal well is utilized as the cathode an important and necessary disclosure is that the surface area for the cathode must be maximized in order to carry a sufficient current through the electrolyte which of course completes the electrical circuit.

There are many ways to maximize surface area, however the inventor of the present invention will disclose the best mode for maximizing cathode surface area. The graphite electrode as shown in FIG. 2 was replaced with a v-shaped wire screen which is commonly used as a well screen to prevent sand entrainment. The large surface area of the v-shaped wire screen immediately formed a large glow discharge when submersed into the carbon crucible with water and baking soda.

This disclosure is unique and unobvious in that it allows every oil and gas well, worldwide, to be converted into an in situ upgrader or heater treater. Referring to FIG. 3, a 1st well screen is separated from a 2nd well screen via an electrical insulator. The electrical insulator may be selected from a high temperature non-electrical conductive material such alumina or zirconia or any ceramic or composite material capable of withstanding temperatures greater than 500° C. Either the 1st or 2nd screen can be the cathode. Of course the other screen would be operated as the anode. In order to operate as an enhanced oil recovery (EOR) system, the only requirement is that the oil or gas must have a sufficient amount of conductivity. And of course most oil and gas wells produce water, hence the term produced water which is a highly conductive solution. The ionic produced water forms the glow discharge upon the cathode. Heavy paraffin wax contained in heavy oil will be upgraded or cracked into smaller molecules. This provides two beneficial attributes. First, since the paraffin waxes are no longer available to plug the well, hot oil injection may be reduced or completely eliminated. Second, since the heavy paraffin waxy hydrocarbons are what make a crude oil heavy, low API, cracking the waxes in situ, may lead to in situ upgrading. The higher the API gravity the easier it is to pump. Likewise, a high API gravity crude brings in a higher price.

In addition, it is well known that plasma electrolysis will produce hydrogen. Not being bound by theory, it is believed that bound sulfur species within crude oil may be converted to hydrogen sulfide when flowed through the PLASMA ELECTROLYSIS WELL SCREEN™. The $H_2S$ can easily be separated from the crude oil with surface separation equipment.

The PLASMA ELECTROLYSIS WELL SCREEN™ can be utilized to fracture wells. For example, since electrolysis generates gases and plasma dramatically increases the temperature of the fluid, the production string simply needs to be filled with an electrolyte. Next, the well head can be shut in. When the DC power supply is energized, a glow discharge will be formed on the cathode. This will increase the pressure and temperature of the fluid while generating gases. The pressure will be released as the formation is fractured, thus more electrolyte may be added to the production string. This process may be very applicable to fracturing horizontal wells as shown in FIG. 5.

Referring to FIG. 5—Horizontal Wells for In Situ Oil Shale Carbonizing with Plasma Electrolysis, the aforementioned well fracturing method can be utilized by installing the PLASMA ELECTROLYSIS WELL SCREEN™ or GLOW DISCHARGE WELL SCREEN™ in both the upper and lower horizontal legs. To fracture the oil shale formation both wells are operated in independent plasma electrolysis modes in order to fracture the formation. Once the oil shale formation is fractured and an electrical circuit can be completed with an electrolyte between the upper and lower leg, then one well can be operated as the cathode while the other leg can be operated as the anode.

The oil shale will be carbonized in situ, thus allowing only light hydrocarbons and hydrogen to be produced with the electrolyte. Of course it will be understood that the electrolyte may be recirculated to minimize water usage. Upon reaching the surface the produced water and shale oil may be further treated and separated with an invention of the present inventor's referred to as the ARCWHIRL™. Not being bound by theory, this process enables carbon sequestration to become a true reality by carbonizing the oil shale, thus minimizing the production of hydrocarbons while maximizing the production of hydrogen. Also, this process enables the hydrogen economy to become a reality utilizing the largest known fossil fuel reserves in the world—oil shale—while allowing the United States to become independent from foreign oil imports.

Different embodiments of the invention described above are also illustrated in the FIGS. 7-12.

Figure 9:
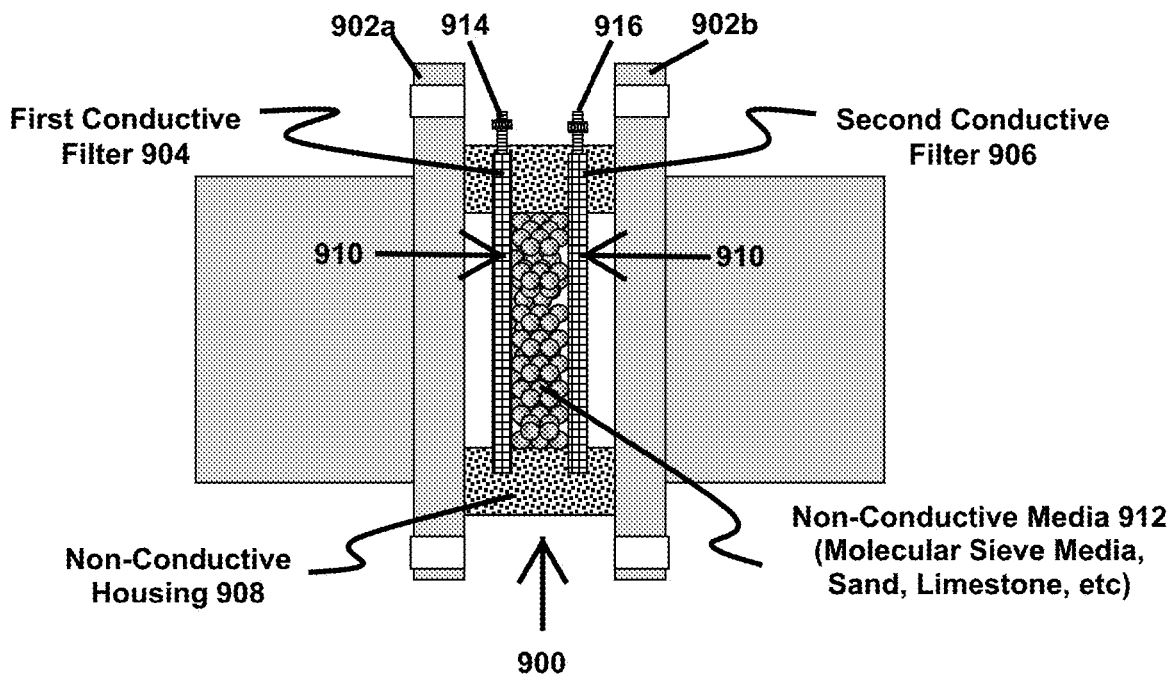
FIG. 9 is a cross-sectional view of a PLASMA ELECTROLYSIS INLINE FLANGE SCREEN™ in accordance with on embodiment of the present invention.

FIG. 9 is a cross-sectional view of a PLASMA ELECTROLYSIS INLINE FLANGE SCREEN™ or Electric Glow Discharge (EGD) assembly 900 in accordance with on embodiment of the present invention. The Electric Glow Discharge (EGD) assembly 900 can be easily installed by sandwiching the EGD assembly 900 between two commonly available flanges or connections 902a and 902b found on fluid transfer devices, such as tanks, vessels, stripper columns, reactors, pipes, or conduits, etc. The EGD assembly 900 includes a first conductive filter screen 904 and a second conductive filter screen 906 attached to a non-conductive housing 908, such as a non-conductive pipe or conduit. The first and second conductive filter screens 904 and 906 can be attached, affixed, potted, cast, molded, integrated or otherwise secured to the non-conductive housing 908. The first and second conductive filter screens 904 and 906 will generally have a relatively flat or planar cross section, and a shape that allows maximum fluid flow between the flanges or connections 902a and 902b (e.g., round shape for pipes and conduits). The equidistant gap 910 between the filter screens 904 and 906 is filled non-conductive granular material 912, such as marbles, ceramic beads, molecular sieve media, sand, limestone, activated carbon, zeolite, zirconium, alumina, rock salt, nut shell, wood chips, etc. The EGD assembly 900 is then sandwiched between the two flanges or connections 902a and 902b. A power supply (not shown) is connected to power supply leads 914 and 916, which are connected to the first filter screen 904 and second filter screen 906, respectively, such that one filter becomes a cathode and the other filter becomes an anode. When the power is turned on and an electrolyte flows through the EGD assembly 900, and an electric glow discharge is formed that treats the fluids flowing through the EGD wafer assembly 900.

Alternatively, the EGD assembly 900 could be integrated into the fluid transfer device, as long as the first conductive filter screen 904 and the second conductive filter screen 906 are electrically isolated from each other and any electrically conductive components. Moreover, the EGD assembly 900 can be equipped with one or more sensors communicably coupled to a control or monitoring unit/system. In some embodiments, the first and second conductive filter screens 904 and 906 along with the non-conductive granular material 912 can be removed without removing the entire EGD assembly 900.

Accordingly, the apparatus for creating an electric glow discharge comprises: a non-conductive housing having a longitudinal axis, a first opening aligned with the longitudinal axis, and a second opening aligned with the longitudinal axis and opposite the first opening; a first electrically conductive screen disposed proximate to the first opening of the housing and substantially perpendicular to the longitudinal axis; a second electrically conductive screen disposed proximate to the second opening of the housing and substantially perpendicular to the longitudinal axis, wherein the second electrically conductive screen separated from the first electrically conductive screen by a substantially equidistant gap; a non-conductive granular material disposed within the substantially equidistant gap; a first electrical terminal electrically connected to the first electrically conductive screen and disposed on an exterior of the housing; a second electrical terminal electrically connected to the second electrically conductive screen and disposed on an exterior of the housing; and wherein the electric glow discharge is created whenever the first electrical terminal is connected to an electrical power supply such that the first electrically conductive screen has a first polarity, the second electrical terminal is connected to the electrical power supply such that the second electrically conductive screen has a second polarity, and an electrically conductive fluid is introduced into the substantially equidistant gap.

In one aspect, the non-conductive granular material (a) does not pass through either electrically conductive screen, (b) allows the electrically conductive fluid to flow between the first electrically conductive screen and the second electrically conductive screen, and (c) prevents electrical arcing between the electrically conductive screens during the electric glow discharge. In another aspect, the non-conductive granular material comprises marbles, ceramic beads, molecular sieve media, sand, limestone, activated carbon, zeolite, zirconium, alumina, rock salt, nut shell or wood chips. In another aspect, an electrical power supply is electrically connected to the first and second electrical terminals. In another aspect, the electrical power supply operates in a range from 50 to 500 volts DC, or 200 to 400 volts DC. In another aspect, the first electrically conductive screen or the second electrically conductive screen reaches a temperature of at least 500° C., 1000° C., or 2000° C. during the electric glow discharge. In another aspect, once the electric glow discharge is created, the electric glow discharge is maintained without the electrically conductive fluid. In another aspect, the electrically conductive fluid comprises water, produced water, wastewater or tailings pond water. In another aspect, the electrically conductive fluid comprises a fluid containing an electrolyte. In another aspect, the electrolyte comprises baking soda, Nahcolite, lime, sodium chloride, ammonium sulfate, sodium sulfate or carbonic acid. In another aspect, the apparatus is configured for installation within a fluid transfer device comprising a tank, vessel, stripper column, reactor, pipe or conduit. In another aspect, the apparatus further comprises a fluid transfer device having a first flange and a second flange, wherein the fluid transfer device comprising a tank, vessel, stripper column, reactor, pipe or conduit; and the housing is attached between the first flange and the second flange. In another aspect, the apparatus comprises one or more sensors disposed within the housing. In another aspect, the first and second conductive filter screens or the non-conductive granular material are removably disposed within the housing.

Industrial Use Example

Figure 10:
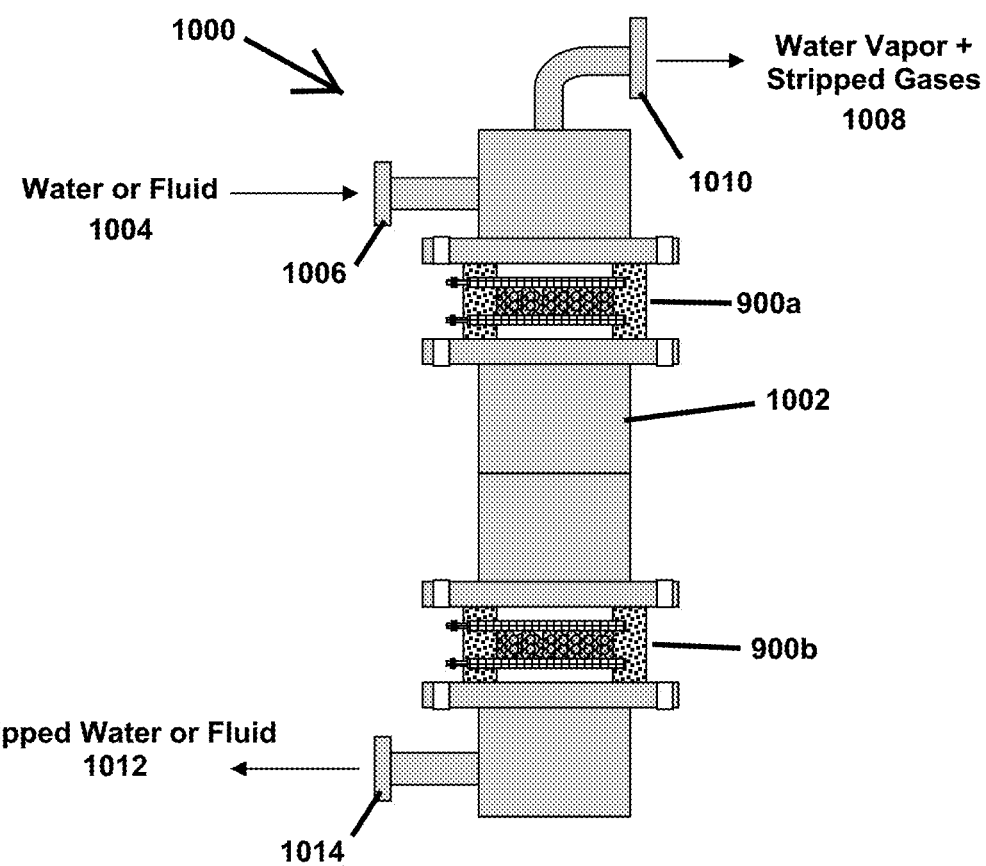
FIG. 10 is a cross-sectional view of a PLASMA ELECTROLYSIS STRIPPER COLUMN™ in accordance with on embodiment of the present invention.

FIG. 10 is a cross-sectional view of a PLASMA ELECTROLYSIS STRIPPER COLUMN™ 1000 in accordance with on embodiment of the present invention. A a pair of EGD assemblies 900a and 900b are installed in a vessel 1002 in order to convert it to a stripper and/or separator 1000. Water or fluid 1004 flows into inlet 1006 above the first EGD assembly 900a and flows down over the first EGD assembly 900a in order to strip gases, generate steam, separate fluids (e.g., oil and water), break emulsions, generate bleach, generate sodium chlorate and/or generate hydrogen. The water vapor and stripped gasses 1008 rise and exit through outlet 1010. The second EGD assembly 900b is placed in series with and below the first EGD assembly 900a. The stripped water or fluid 1012 flows out the bottom through outlet 1014. Note that it is not necessary to place the second EGD assembly 900b on the same tank, vessel, stripper column, reactor, pipe or conduit. Moreover, more than two EGD assemblies 900 can be used.

Macondo Deepwater Horizon Oil Spill

Figure 11:
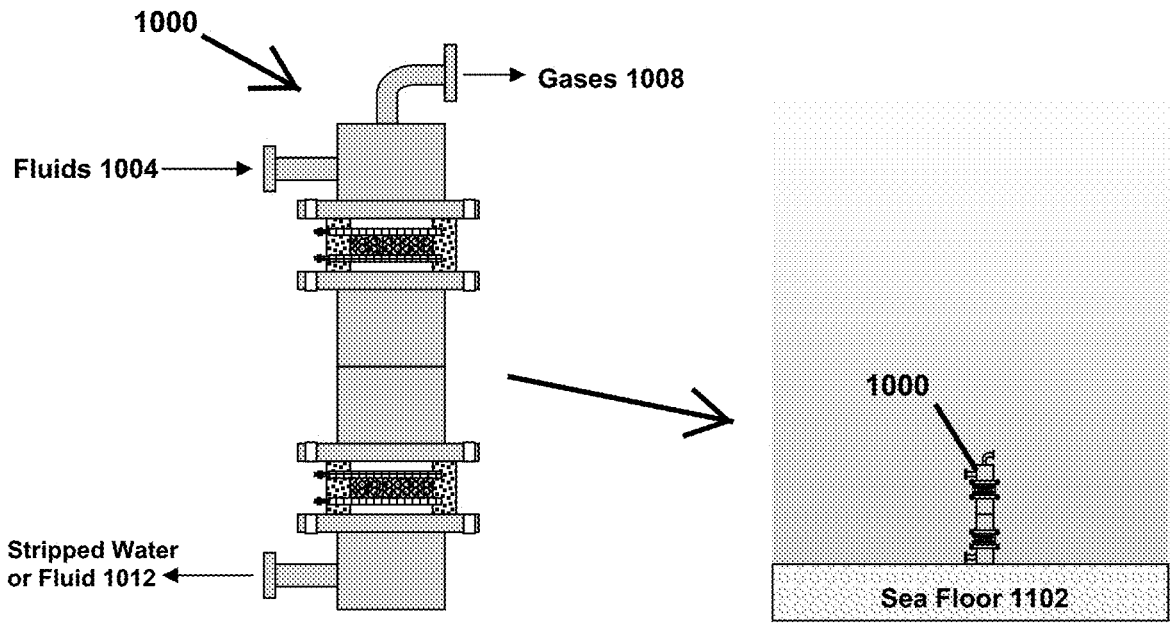
FIG. 11 is a cross-sectional view of a SURFACE AND SUBSEA PLASMA ELECTROLYSIS METHANE HYDRATE BUSTER™ in accordance with on embodiment of the present invention.

On Apr. 20, 2010 the Deepwater Horizon Semi-Submersible Drilling Rig experienced the largest blowout and consequently the largest marine oil spill within the history of the petroleum industry. Turning now to FIGS. 10 and 11 the apparatus 1000 can be installed on the sea floor 1102 as a means for separating oil, gas and water as well as treating the water that may have residual amounts of entrained hydrocarbons. As a result, this embodiment provides a SURFACE AND SUBSEA PLASMA ELECTROLYSIS METHANE HYDRATE BUSTER™ 1000.

The inventor of the present invention has tested various emulsions with an Electric Glow Discharge cell. All emulsions were broken with the EGD Cell. Consequently, one of the methods for treating oil spills is to add a dispersant. However, this creates a problem in that it forms an emulsion. Thus, by locating the present invention on the Sea Floor, a supply vessel, and/or drilling rig, this gives the Oil & Gas Operator an assurance means for being able to treat oil spills.

Accordingly, the system for creating an electric glow discharge comprises: a fluid transfer device having one or more sets of first flanges and second flanges, wherein the fluid transfer device comprising a tank, vessel, stripper column, reactor, pipe or conduit; an electric glow discharge device attached between each set first flanges and second flanges, where each electric glow discharge device comprises: a non-conductive housing having a longitudinal axis, a first opening aligned with the longitudinal axis, and a second opening aligned with the longitudinal axis and opposite the first opening, a first electrically conductive screen disposed proximate to the first opening of the housing and substantially perpendicular to the longitudinal axis, a second electrically conductive screen disposed proximate to the second opening of the housing and substantially perpendicular to the longitudinal axis, wherein the second electrically conductive screen separated from the first electrically conductive screen by a substantially equidistant gap, a non-conductive granular material disposed within the substantially equidistant gap, a first electrical terminal electrically connected to the first electrically conductive screen and disposed on an exterior of the housing, and a second electrical terminal electrically connected to the second electrically conductive screen and disposed on an exterior of the housing; an electrical power source electrically connected to the first and second electrical terminals; and wherein the electric glow discharge is created whenever the first electrical terminal is connected to an electrical power supply such that the first electrically conductive screen has a first polarity, the second electrical terminal is connected to the electrical power supply such that the second electrically conductive screen has a second polarity, and an electrically conductive fluid is introduced into the substantially equidistant gap.

In one aspect, the non-conductive granular material (a) does not pass through either electrically conductive screen, (b) allows the electrically conductive fluid to flow between the first electrically conductive screen and the second electrically conductive screen, and (c) prevents electrical arcing between the electrically conductive screens during the electric glow discharge. In another aspect, the non-conductive granular material comprises marbles, ceramic beads, molecular sieve media, sand, limestone, activated carbon, zeolite, zirconium, alumina, rock salt, nut shell or wood chips. In another aspect, the electrical power supply operates in a range from 50 to 500 volts DC, or 200 to 400 volts DC. In another aspect, the first electrically conductive screen or the second electrically conductive screen reaches a temperature of at least 500° C., 1000° C., or 2000° C. during the electric glow discharge. In another aspect, once the electric glow discharge is created, the electric glow discharge is maintained without the electrically conductive fluid. In another aspect, the electrically conductive fluid comprises water, produced water, wastewater or tailings pond water. In another aspect, the electrically conductive fluid comprises a fluid containing an electrolyte. In another aspect, the electrolyte comprises baking soda, Nahcolite, lime, sodium chloride, ammonium sulfate, sodium sulfate or carbonic acid. In another aspect, the system further comprises one or more sensors disposed within the housing. In another aspect, the first and second conductive filter screens or the non-conductive granular material are removably disposed within the housing.

Moreover, the present invention provides a method for creating an electric glow discharge by providing a glow discharge apparatus comprising: a non-conductive housing having a longitudinal axis, a first opening aligned with the longitudinal axis, and a second opening aligned with the longitudinal axis and opposite the first opening, a first electrically conductive screen disposed proximate to the first opening of the housing and substantially perpendicular to the longitudinal axis, a second electrically conductive screen disposed proximate to the second opening of the housing and substantially perpendicular to the longitudinal axis, wherein the second electrically conductive screen separated from the first electrically conductive screen by a substantially equidistant gap, a non-conductive granular material disposed within the substantially equidistant gap, a first electrical terminal electrically connected to the first electrically conductive screen and disposed on an exterior of the housing, and a second electrical terminal electrically connected to the second electrically conductive screen and disposed on an exterior of the housing; connecting the first and second electrical terminals to an electrical power supply such that the first electrically conductive screen has a first polarity, and the second electrically conductive screen has a second polarity; and creating the electric glow discharge by introducing an electrically conductive fluid into the substantially equidistant gap. The aspects described above with respect to the apparatus and system are also applicable to the method.

Reverse Polarity EGD Screen Assembly

Figure 12:
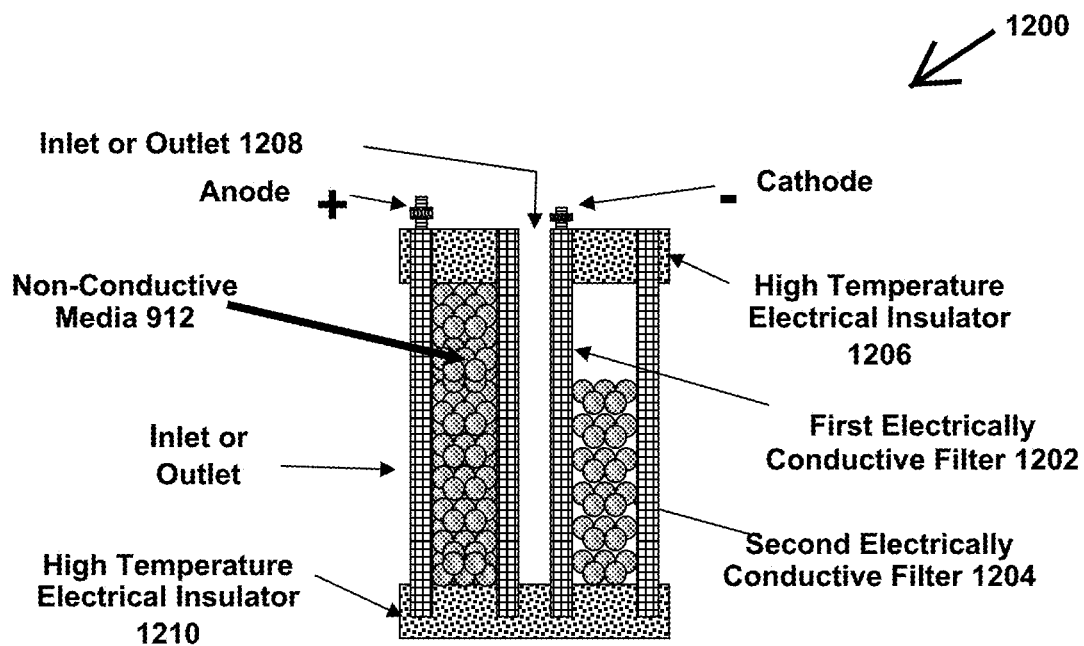
FIG. 12 is a cross-sectional view of a Plasma Electrolysis Well Screen™ or Filter Screen in accordance with on embodiment of the present invention.

FIG. 12 is a cross-sectional view of a Plasma Electrolysis Well Screen™ or Filter Screen or EGD Tube Assembly 1200 in accordance with on embodiment of the present invention. In this embodiment, the polarity of the screens is reversed when compared and contrasted to the disclosures of FIGS. 3 and 4. In comparison, the assemblies are similar in that a first electrically conductive inner screen 1202 is disposed within a larger second electrically outer screen 1204 and the annulus or gap between the screens is filled with a non-conductive media 912. The inner and outer screens 1202 and 1204 are potted, cast, cemented or affixed to a first non-conductive end 1206 and a second non-conductive end 1206. One end of the non-conductive material 1206 has a hole 1208 within the center for fluid to flow in or out of the inner screen 1202. The other end of the non-conductive material 1210 is closed. In addition, fluid can flow in or out of the EGD Tube Assembly 200 via the outer screen 1204. However, in contrast to FIGS. 3 and 4, the EGD Tube Assembly 1200 uses the first electrically conductive inner screen 1202 as the cathode and the second electrically conductive outer screen 1204 as the anode. An electric glow discharge is formed when power is supplied to the first screen and the second screen, and an electrolyte is flowed into the EGD Tube Assembly 1200 in order to close the electrical circuit. However, it will be understood that once electrically conductive matter, such as salts, are deposited upon the media, the EGD Tube Assembly 200 will still function properly even when a non-conductive fluid is used.

Although preferred embodiments of the present invention have been described in detail, it will be understood by those skilled in the art that various modifications can be made therein without departing from the spirit and scope of the invention as set forth in the appended claims.

What is claimed is:

1. An apparatus for creating an electric glow discharge comprising:
    a non-conductive housing configured for installation within a fluid transfer device, wherein the non-conductive housing has a longitudinal axis aligned with the fluid transfer device, a first opening aligned with the longitudinal axis, and a second opening aligned with the longitudinal axis and opposite the first opening;
    a first electrically conductive screen attached to the non-conductive housing and disposed proximate to the first opening of the housing and substantially perpendicular to the longitudinal axis;
    a second electrically conductive screen attached to the non-conductive housing and disposed proximate to the second opening of the housing and substantially perpendicular to the longitudinal axis, wherein the second electrically conductive screen is separated from the first electrically conductive screen by a substantially equidistant gap;
    a non-conductive granular material disposed within the substantially equidistant gap;
    a first electrical terminal electrically connected to the first electrically conductive screen and disposed on an exterior of the housing;
    a second electrical terminal electrically connected to the second electrically conductive screen and disposed on an exterior of the housing; and
    wherein the electric glow discharge is created whenever the first electrical terminal is connected to an electrical power supply such that the first electrically conductive screen has a first polarity, the second electrical terminal is connected to the electrical power supply such that the second electrically conductive screen has a second polarity, and an electrically conductive fluid is introduced into the substantially equidistant gap.

2. The apparatus as recited in claim 1, wherein the non-conductive granular material (a) does not pass through either electrically conductive screen, (b) allows the electrically conductive fluid to flow between the first electrically conductive screen and the second electrically conductive screen, and (c) prevents electrical arcing between the electrically conductive screens during the electric glow discharge.

3. The apparatus as recited in claim 1, wherein the non-conductive granular material comprises marbles, ceramic beads, molecular sieve media, sand, limestone, activated carbon, zeolite, zirconium, alumina, rock salt, nut shell or wood chips.

4. The apparatus as recited in claim 1, further comprising an electrical power supply electrically connected to the first and second electrical terminals.

5. The apparatus as recited in claim 4, wherein the electrical power supply operates in a range from 50 to 500 volts DC.

6. The apparatus as recited in claim 4, wherein the first electrically conductive screen or the second electrically conductive screen reaches a temperature of at least 500° C. during the electric glow discharge.

7. The apparatus as recited in claim 4, wherein once the electric glow discharge is created, the electric glow discharge is maintained without the electrically conductive fluid.

8. The apparatus as recited in claim 4, wherein the electrically conductive fluid comprises water, produced water, wastewater or tailings pond water.

9. The apparatus as recited in claim 4, wherein the electrically conductive fluid comprises a fluid containing an electrolyte.

10. The apparatus as recited in claim 9, wherein the electrolyte comprises baking soda, Nahcolite, lime, sodium chloride, ammonium sulfate, sodium sulfate or carbonic acid.

11. The apparatus as recited in claim 1, wherein the fluid transfer device comprises a tank, vessel, stripper column, reactor, pipe or conduit.

12. The apparatus as recited in claim 1, further comprising:
    the fluid transfer device has a first flange and a second flange; and
    the housing is configured to be attached between the first flange and the second flange.

13. The apparatus as recited in claim 1, further comprising one or more sensors disposed within the housing.

14. The apparatus as recited in claim 1, wherein the first and second conductive filter screens or the non-conductive granular material are removably disposed within the housing.

15. A system for creating an electric glow discharge comprising:
- a fluid transfer device having one or more sets of first flanges and second flanges, wherein the fluid transfer device comprising a tank, vessel, stripper column, reactor, pipe or conduit;
- an electric glow discharge device attached between each set first flanges and second flanges, where each electric glow discharge device comprises:
  - a non-conductive housing having a longitudinal axis aligned with the fluid transfer device, a first opening aligned with the longitudinal axis, and a second opening aligned with the longitudinal axis and opposite the first opening,
  - a first electrically conductive screen attached to the non-conductive housing and disposed proximate to the first opening of the housing and substantially perpendicular to the longitudinal axis,
  - a second electrically conductive screen attached to the non-conductive housing and disposed proximate to the second opening of the housing and substantially perpendicular to the longitudinal axis, wherein the second electrically conductive screen is separated from the first electrically conductive screen by a substantially equidistant gap,
  - a non-conductive granular material disposed within the substantially equidistant gap,
  - a first electrical terminal electrically connected to the first electrically conductive screen and disposed on an exterior of the housing, and
  - a second electrical terminal electrically connected to the second electrically conductive screen and disposed on an exterior of the housing;
- an electrical power source electrically connected to the first and second electrical terminals; and
- wherein the electric glow discharge is created whenever the first electrical terminal is connected to an electrical power supply such that the first electrically conductive screen has a first polarity, the second electrical terminal is connected to the electrical power supply such that the second electrically conductive screen has a second polarity, and an electrically conductive fluid is introduced into the substantially equidistant gap.

16. The system as recited in claim 15, wherein the non-conductive granular material (a) does not pass through either electrically conductive screen, (b) allows the electrically conductive fluid to flow between the first electrically conductive screen and the second electrically conductive screen, and (c) prevents electrical arcing between the electrically conductive screens during the electric glow discharge.

17. The system as recited in claim 15, wherein the non-conductive granular material comprises marbles, ceramic beads, molecular sieve media, sand, limestone, activated carbon, zeolite, zirconium, alumina, rock salt, nut shell or wood chips.

18. The system as recited in claim 15, wherein the electrical power supply operates in a range from 50 to 500 volts DC.

19. The system as recited in claim 15, wherein the first electrically conductive screen or the second electrically conductive screen reaches a temperature of at least 500° C. during the electric glow discharge.

20. The system as recited in claim 15, wherein once the electric glow discharge is created, the electric glow discharge is maintained without the electrically conductive fluid.

21. The system as recited in claim 15, wherein the electrically conductive fluid comprises water, produced water, wastewater or tailings pond water.

22. The system as recited in claim 15, wherein the electrically conductive fluid comprises a fluid containing an electrolyte.

23. The system as recited in claim 22, wherein the electrolyte comprises baking soda, Nahcolite, lime, sodium chloride, ammonium sulfate, sodium sulfate or carbonic acid.

24. The system as recited in claim 15, further comprising one or more sensors disposed within the housing.

25. The system as recited in claim 15, wherein the first and second conductive filter screens or the non-conductive granular material are removably disposed within the housing.

26. A method for creating an electric glow discharge comprising:
- providing an electric glow discharge apparatus comprising:
  - a non-conductive housing configured for installation within a fluid transfer device, wherein the non-conductive housing has a longitudinal axis aligned with the fluid transfer device, a first opening aligned with the longitudinal axis, and a second opening aligned with the longitudinal axis and opposite the first opening;
  - a first electrically conductive screen attached to the non-conductive housing and disposed proximate to the first opening of the housing and substantially perpendicular to the longitudinal axis;
  - a second electrically conductive screen attached to the non-conductive housing and disposed proximate to the second opening of the housing and substantially perpendicular to the longitudinal axis, wherein the second electrically conductive screen is separated from the first electrically conductive screen by a substantially equidistant gap;
  - a non-conductive granular material disposed within the substantially equidistant gap;
  - a first electrical terminal electrically connected to the first electrically conductive screen and disposed on an exterior of the housing; and
  - a second electrical terminal electrically connected to the second electrically conductive screen and disposed on an exterior of the housing;
- connecting the first and second electrical terminals to an electrical power supply such that the first electrically conductive screen has a first polarity, and the second electrically conductive screen has a second polarity; and
- creating the electric glow discharge by introducing an electrically conductive fluid into the substantially equidistant gap.

27. The method as recited in claim 26, wherein the non-conductive granular material (a) does not pass through either electrically conductive screen, (b) allows the electrically conductive fluid to flow between the first electrically conductive screen and the second electrically conductive screen, and (c) prevents electrical arcing between the electrically conductive screens during the electric glow discharge.

28. The method as recited in claim 26, wherein the non-conductive granular material comprises marbles, ceramic beads, molecular sieve media, sand, limestone, activated carbon, zeolite, zirconium, alumina, rock salt, nut shell or wood chips.

29. The method as recited in claim 26, further comprising providing an electrical power supply electrically connected to the first and second electrical terminals.

30. The method as recited in claim 29, further comprising operating the electrical power supply in a range from 50 to 500 volts DC.

31. The method as recited in claim 29, wherein the first electrically conductive screen or the second electrically conductive screen reaches a temperature of at least 500° C. during the electric glow discharge.

32. The method as recited in claim 29, further comprising, once the electric glow discharge is created, maintaining the electric glow discharge without the electrically conductive fluid.

33. The method as recited in claim 29, wherein the electrically conductive fluid comprises water, produced water, wastewater or tailings pond water.

34. The method as recited in claim 29, wherein the electrically conductive fluid comprises a fluid containing an electrolyte.

35. The method as recited in claim 34, wherein the electrolyte comprises baking soda, Nahcolite, lime, sodium chloride, ammonium sulfate, sodium sulfate or carbonic acid.

36. The method as recited in claim 26, wherein the fluid transfer device comprises a tank, vessel, stripper column, reactor, pipe or conduit.

37. The method as recited in claim 26, wherein:
the fluid transfer device has a first flange and a second flange; and
the housing is configured to be attached between the first flange and the second flange.

38. The method as recited in claim 26, further comprising providing one or more sensors disposed within the housing.

39. The method as recited in claim 26, wherein the first and second conductive filter screens or the non-conductive granular material are removably disposed within the housing.

* * * * *